(12) United States Patent
Kim et al.

(10) Patent No.: US 8,860,692 B2
(45) Date of Patent: Oct. 14, 2014

(54) TOUCH PAD AND METHOD FOR DETECTING MULTI-TOUCH USING THE SAME

(75) Inventors: Young-Wook Kim, Daejeon (KR); Won-Cheol Hong, Daejeon (KR)

(73) Assignee: Zinitix Co., Ltd., Daejeon (KR)

( * ) Notice: Subject to any disclaimer, the term of this patent is extended or adjusted under 35 U.S.C. 154(b) by 125 days.

(21) Appl. No.: 13/429,112

(22) Filed: Mar. 23, 2012

(65) Prior Publication Data

US 2013/0249851 A1    Sep. 26, 2013

(51) Int. Cl.
 *G06F 3/045*    (2006.01)
(52) U.S. Cl.
 USPC ........................................................ 345/174
(58) Field of Classification Search
 CPC .................. G06F 3/044; G01D 5/24
 USPC ..................... 345/173, 174; 178/18.03, 18.06
 See application file for complete search history.

(56) References Cited

U.S. PATENT DOCUMENTS

| | | | |
|---|---|---|---|
| 8,279,187 B2* | 10/2012 | Geaghan | 345/173 |
| 2007/0008299 A1* | 1/2007 | Hristov | 345/173 |
| 2009/0273579 A1 | 11/2009 | Zachut et al. | |
| 2010/0134422 A1* | 6/2010 | Borras | 345/173 |
| 2010/0231531 A1* | 9/2010 | Yang et al. | 345/173 |
| 2012/0262410 A1* | 10/2012 | Lim | 345/174 |

FOREIGN PATENT DOCUMENTS

| | | |
|---|---|---|
| JP | 06-222873 | 8/1994 |
| WO | WO 2009/133559 A2 | 11/2009 |

* cited by examiner

*Primary Examiner* — Pegeman Karimi

(57) ABSTRACT

A touch pad for detecting multi-touch includes a lower pad layer and an upper pad layer being formed of ITO, the upper pad layer overlying the lower pad layer. The lower pad layer includes a plurality of lower pads arranged in a first matrix shape, each of lower pads sensing capacitances caused by the multi-touch. The upper pad layer includes a plurality of upper pads arranged in a second matrix shape. The upper pads are sequentially controlled to put into high-impedance (open circuit) state so that the capacitances can be obtained by the respective set of lower pads corresponding to the upper pad which has been put into the impedance state.

11 Claims, 12 Drawing Sheets

LOWER PAD LAYER     UPPER PAD LAYER     MATRIX ARRANGEMENT

TOUCH PAD AND METHOD FOR DETECTING MULTI-TOUCH USING THE SAME

FIELD OF THE INVENTION

The present invention relates to a technology of detecting multi-touch in a touch pad; and more particularly, to a capacitive touch pad for detecting multi-touch and a method for detecting multi-touch using the capacitive touch pad.

BACKGROUND OF THE INVENTION

As is well known, recently, the development of processor manufacturing technique, increment of memory capacity and development of multimedia encoding tools allow a variety of additional functions to include within portable devices such as cellular phones, personal digital assistants (PDAs) and so on. Moreover, the menus for those additional functions in the portable devices are practically being enlarged, and thus, key pads are not good enough anymore to represent those various functions in the portable devices.

Further, in view of a trend in which a number-based or text-based user interface is transited into a graphic-based user interface, it is difficult to utilize efficiently graphic-based application programs running on the portable devices with ordinary number, letter and direction keys. In addition, a demand for a display device with a wide screen is increasing as the portable devices include a variety of image display functions for a multimedia reproduction, a communication function for a mobile internet or others.

Moreover, in recent, the portable devices employ a touch screen in which functions to perform key and display operations are implemented in one unit without separate key pad. The touch screen allows users to use the application programs interactively and perceptively, by touching a button or a graphic icon on a display area with a finger or a pen, which results in a simplified manipulation. Also, the graphic icons for the key operation can be easily identified by users as they are optimized for the respective application programs. Therefore, the key operation becomes easier.

In addition, since a touch pad is integrated with a display device in a single body, the touch screen does not require an additional space for key pad, unlike a conventional portable device. Therefore, the touch pad may have an advantage that it can be adapted to the portable devices to provide a wider display screen.

The touch screen is classified into a capacitive overlay system, an infrared beam system, a surface acoustic wave system, a Piezo electric system, an integral strain gauge system, and a resistive overlay system. For example, the capacitive overlay touch screen uses sensing data represented on each of "x" and "y" axes to control various operations on the touch screen.

Meanwhile, FIGS. 1A and 1B show capacitive touch pads of a related art. FIGS. 2A and 2B are graphs illustrating data detected when a capacitive touch pad of a related art is touched by an object. The capacitive touch pad determines whether or not an object is touched by the following Equation.

$$\tau = R \times (Cp + Cf) \quad \text{[Equation]}$$

In Equation, "τ" represents a time constant in a circuit with a resistor and a capacitor, "R" represents a resistance of the touch pad, "Cp" represents a capacitance of the touch pad, and the "Cf" represents a capacitance caused by a touch of the object to the touch pad. If the object is approaching the touch pad, the capacitance Cf is varied and in turn the time constant "τ" is varied. Accordingly, it is possible to determine whether or not the touch pad is touched by continuously monitoring the time constant.

The capacitive touch pad of a related art may have a diamond pattern shown in FIG. 1A or a layer bar pattern shown in FIG. 1B. If the capacitive touch pad is touched by an object, it is possible to get data on x-axis shown in FIG. 2A and data on y-axis shown in FIG. 2B. In this case, a coordinate of a touched position is (4, 7) in the capacitive touch pad. Therefore, an operation corresponding to the coordinate may be performed in a touch screen.

FIGS. 3A and 3B shows graphs illustrating data measured when a capacitive touch pad of a related art is touched at multiple points by objects. For example, if the capacitive touch pad is touched at multiple points by two objects, it is possible to get data on x-axis and y-axis as shown in FIGS. 3A and 3B. As known in FIGS. 3A and 3B, the data are 1 and 5 for x-axis, 2 and 8 for y-axis. In other words, the two touch positions have 4 coordinates such as (1, 2), (1, 8), (5, 2) and (2, 8). Consequently, the two touch positions have two real coordinate values and two virtual coordinate values.

As described above, when the capacitive touch pad is touched at only one point, it is possible to drive a touch screen because the touched position is easily recognized. However, if the capacitive touch pad is touched at multiple points, virtual coordinates with real coordinates coexist, which entails a difficulty to identify the real coordinates.

SUMMARY OF THE INVENTION

In view of the above, the present invention provides a capacitive touch pad and a method for detecting multi-touch using the touch pad.

In accordance with an aspect of the present invention, there is provided a touch pad for detecting multi-touch, which includes:

a lower pad layer and an upper pad layer being formed of ITO (Indium Tin Oxide), the upper pad layer overlying the lower pad layer, wherein the lower pad layer includes a plurality of lower pads arranged in a first matrix shape, each of the lower pads sensing capacitances values caused by the multi-touch;

wherein an upper pad layer includes a plurality of upper pads arranged in a second matrix shape; and wherein the upper pads are sequentially controlled to put into high-impedance (open circuit) state so that the capacitances can be obtained by the respective set of lower pads corresponding to the upper pad which has been put into the impedance state.

Preferably, the multi-touch is detected as one or more coordinates of lower pads with relatively high capacitance values.

In accordance with another aspect of the present invention, there is provided a method for detecting multi-touch using a touch pad, the touch pad including a lower pad layer and an upper pad layer being formed of ITO (Indium Tin Oxide), the upper pad layer overlying the lower pad layer, wherein the lower pad layer includes a plurality of lower pads arranged in a first matrix shape, each of the lower pads sensing capacitances values caused by the multi-touch, wherein the upper pad layer includes a plurality of upper pads arranged in a second matrix shape, the method including:

controlling each of the upper pads to put into high-impedance (open circuit) state in sequence;

measuring capacitances from the set of lower pads layer corresponding to the upper pad which has been put into the impedance state; and detecting one or more coordinates of the lower pads with relatively high capacitance values.

Preferably, the multi-touch is detected as the one or more coordinates of lower pads with relatively high capacitances.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1A:
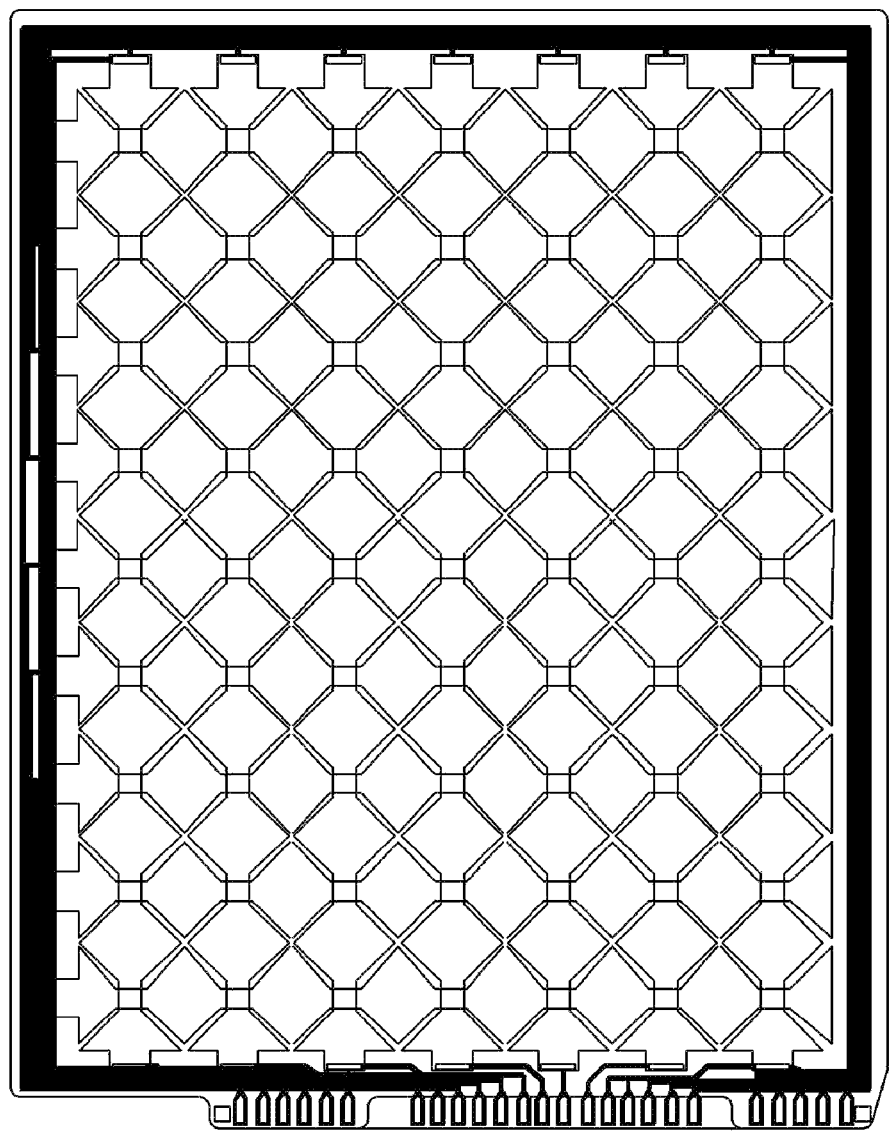
FIGS. 1A and 1B show capacitive touch pads of a related art.
Figure 1B:
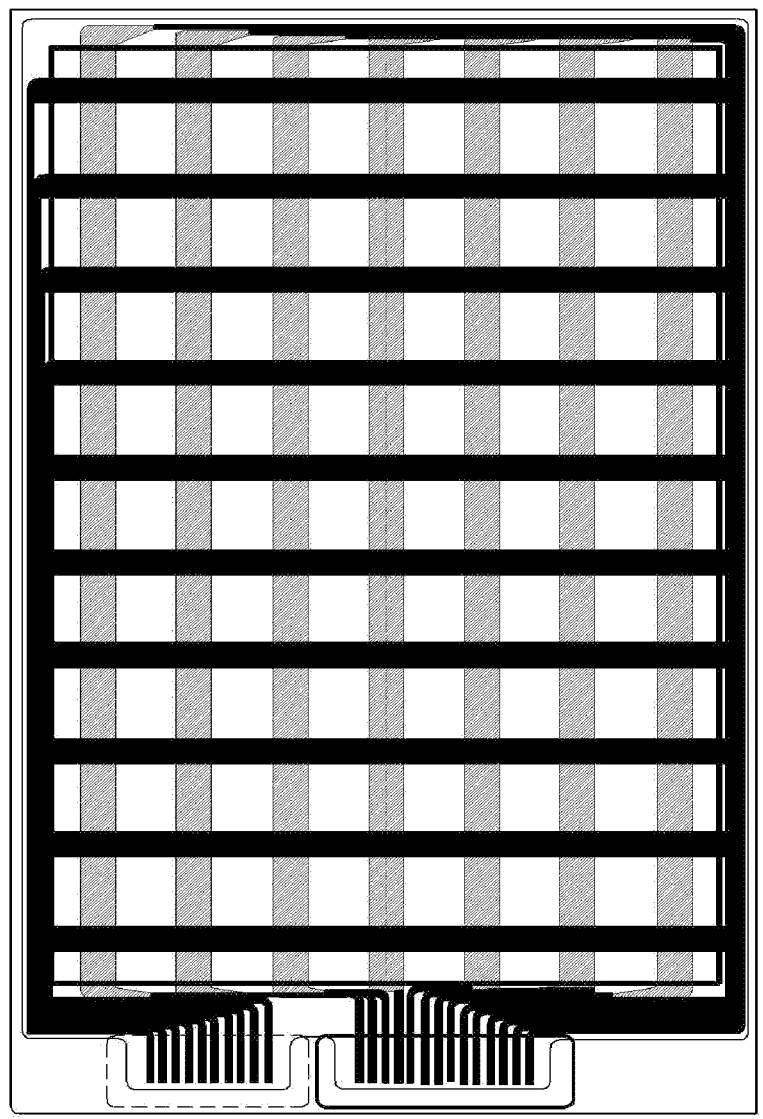
Figure 2A:
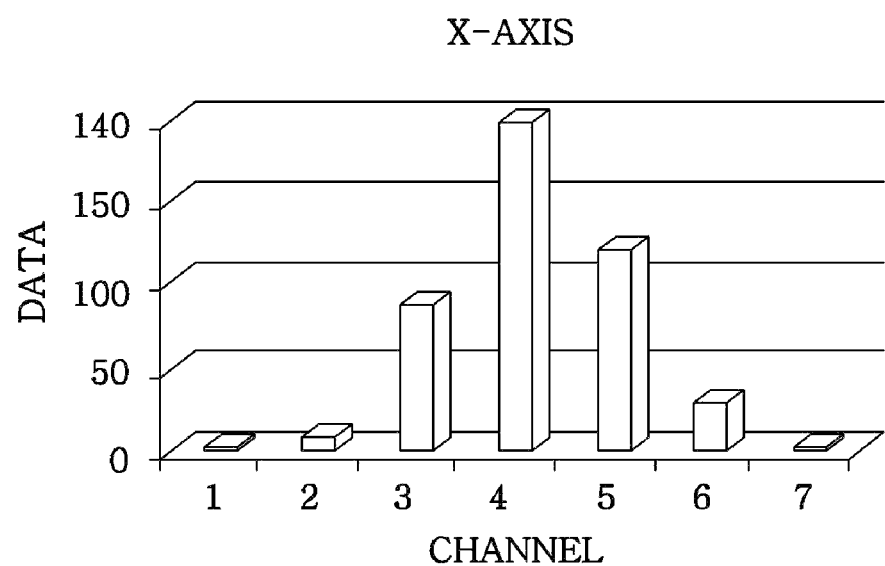
FIGS. 2A and 2B are graphs illustrating data measured when a capacitive touch pad of a related art is touched by an object.
Figure 2B:
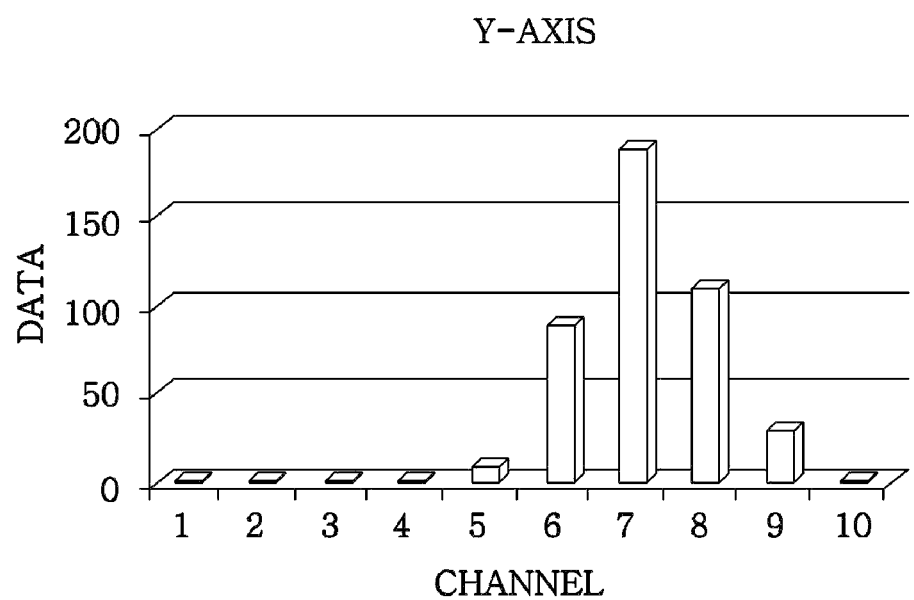
Figure 3A:
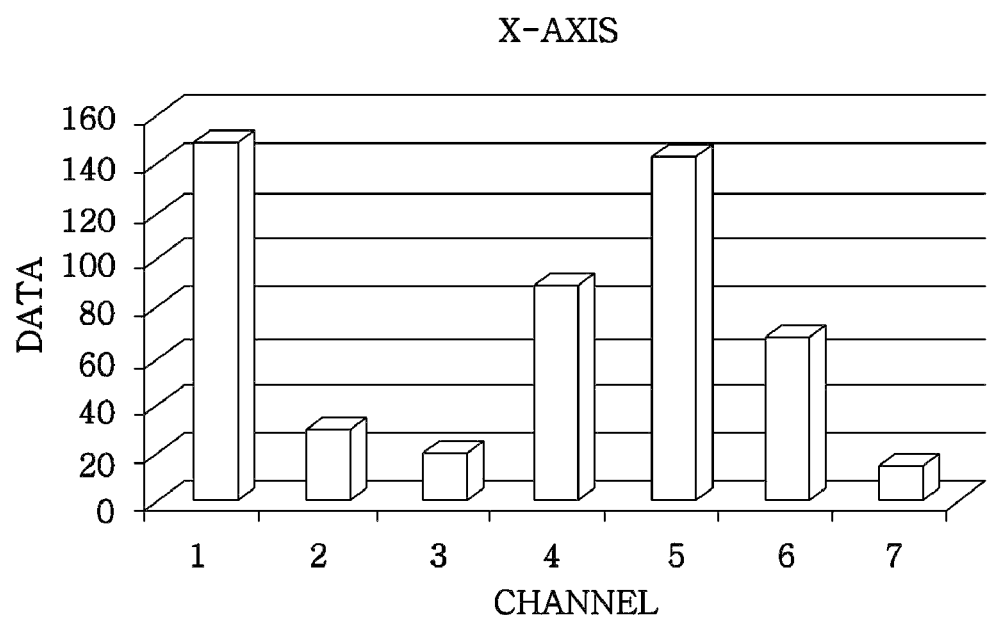
FIGS. 3A and 3B are graphs illustrating data measured when the related art capacitive touch pad is touched at multiple points by objects.
Figure 3B:
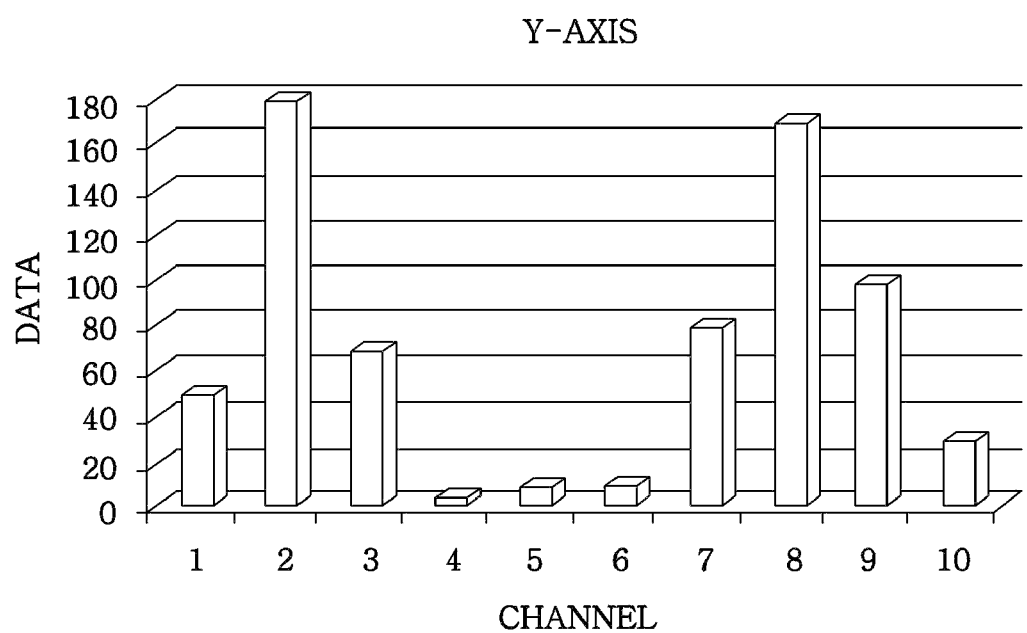
Figure 4:
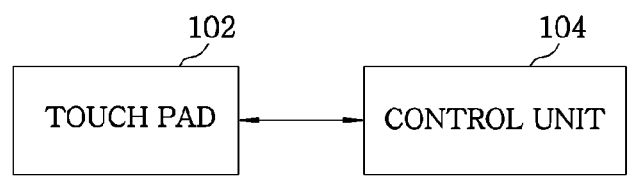
FIG. 4 is a block diagram of a touch screen device having a capacitive touch pad.
Figure 5:
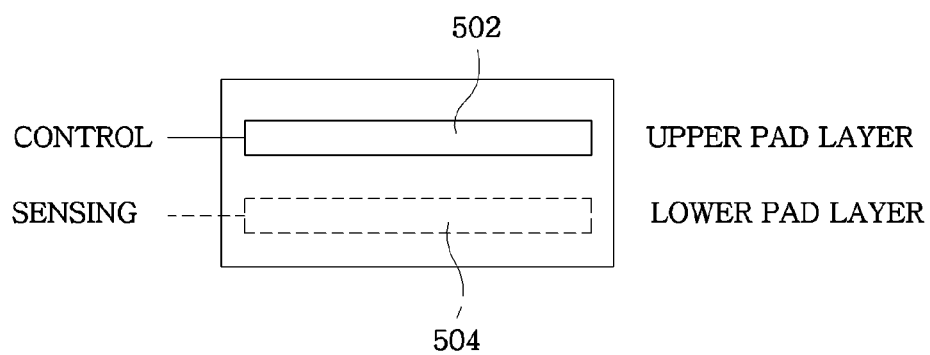
FIG. 5 illustrates a configuration of the capacitive touch pad shown in FIG. 4.

FIG. 4 is a block diagram of a touch screen device having a capacitive touch pad, and FIG. 5 illustrates a configuration of the capacitive touch pad shown in FIG. 4.

As shown in FIG. 4, the touch screen device includes a touch pad 102 and a control unit 104. The touch pad 102 employs a capacitive overlay scheme to recognize a touch by an object.

Referring to FIG. 5, the touch pad 102 includes a matrix arrangement of an upper pad layer 502 having a plurality of upper pads and a lower pad layer 504 having a plurality of lower pads. The upper and lower pad layers are formed of indium-tin-oxide (ITO). The upper pads have control lines connected to the control unit 104 and the lower pads have sensing lines connected to the control unit 104. The upper pad layer 502 is controlled to be in either ground (GND) or high impedance (i.e., open) state through the control lines. If the upper pad layer 502 is put in the GND state, a capacitance caused by a touch of an object thereto is shielded and is not transferred to the lower pad layer 504. Meanwhile, when the upper pad layer 502 is put in a high impedance state, a capacitance is measured by the lower pad layer 504.

Figure 6:
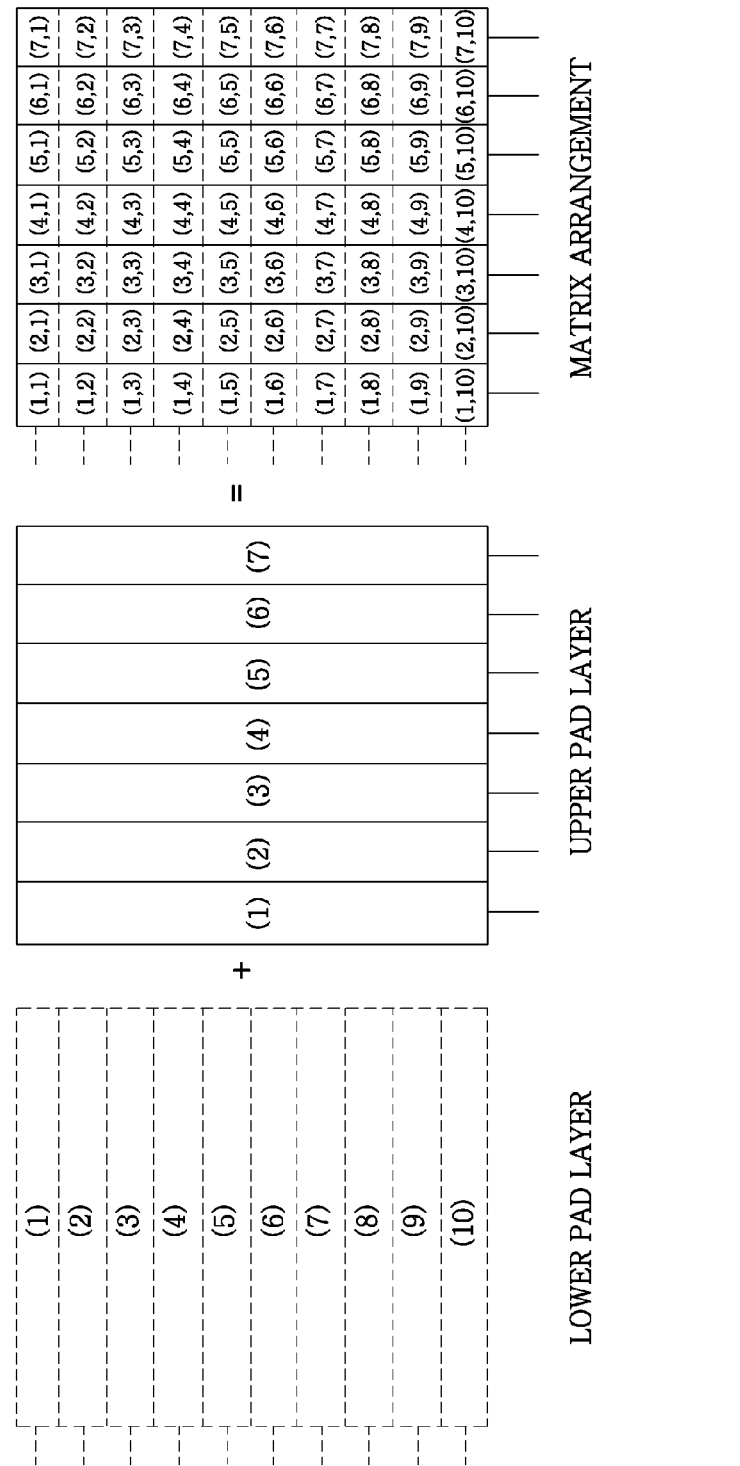
FIG. 6 illustrates a configuration of a capacitive touch pad with a matrix arrangement in accordance with a first embodiment of the present invention.

The configuration of the capacitive touch pad 102 will now be described in detail with reference with FIG. 6. FIG. 6 is a configuration of the capacitive touch pad 102 with a matrix arrangement in accordance with a first embodiment of the present invention.

The touch pad 102 is configured in an M×N matrix arrangement of the upper and lower pads, wherein "M" and "N" are integers except "0". For the touch pad 102 having a 7×10 matrix arrangement, the touch pad 102 is configured by sequentially arranging first (1) to tenth (10) lower pads of the lower pad layer 502 in a horizontal direction, sequentially arranging first (1) to seventh (7) upper pads of the upper pad layer 504 in a vertical direction perpendicular to the horizontal direction, and overlying the upper pad layer 502 on the lower pad layer 504, thereby forming the matrix arrangement of FIG. 6. In the 7×10 matrix arrangement, cells having coordinates of positions (1,1) to (7,10) are used to sense a touch.

In order to sense the touch in the matrix arrangement, a first (1) upper pad is put in the open state and the other upper pads are put in the ground state (GND). Then, sensing data having capacitances are measured on coordinates of positions (1,1), (1,2), (1,3), (1,4), (1,5), (1,6), (1,7), (1,8), (1,9) and (1,10) of the cells. Subsequently, when the second (2) to seventh (7) upper pads of the upper pad layer are controlled in sequence of [GND, Open, GND, GND, GND, GND, GND]→[GND, GND, Open, GND, GND, GND, GND]→[GND, GND, GND, Open, GND, GND, GND]→[GND, GND, GND, GND, Open, GND, GND]→[GND, GND, GND, GND, GND, Open, GND]→[GND, GND, GND, GND, GND, GND, Open], sensing data having capacitances are measured on coordinates of positions of the cells in the matrix arrangement. Thereafter, the data measured at the coordinates (1,1) to (7,10) of the cells in the matrix arrangement are provided to the control unit 104.

Figure 7:
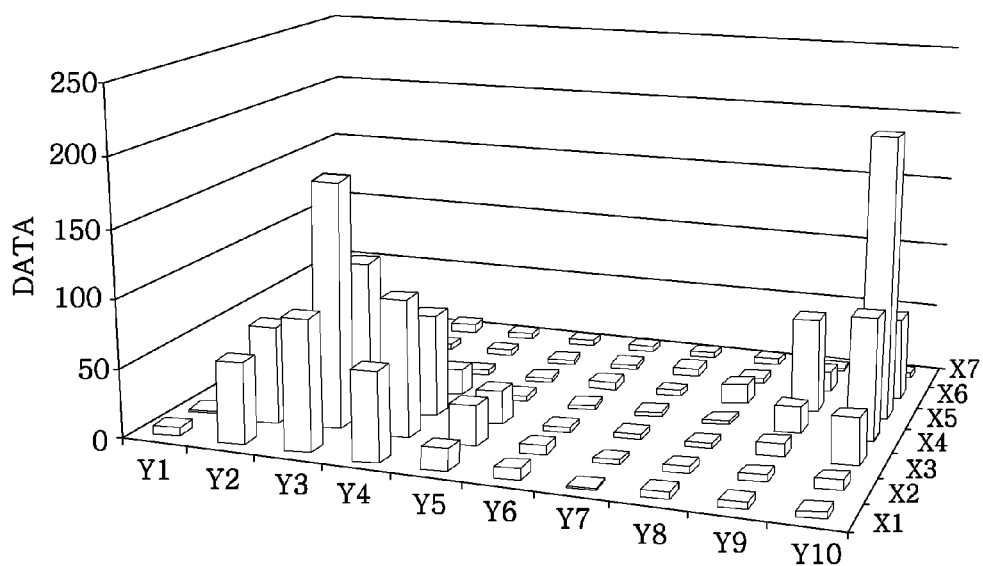
FIG. 7 is a graph illustrating data measured when a touch pad shown in FIG. 4 is touched at multiple points by objects in accordance with the embodiment of the present invention.

FIG. 7 is a graph illustrating data measured when the touch pad of 7×10 matrix arrangement is touched at multiple points by an object.

In FIG. 7, at least one sensing data having a relatively high capacitance is selected to recognize at least one cell having a position of the multi-touch in the touch pad 102. As can be seen from FIG. 7, two cells having coordinates (2,3) and (5,10) have the relatively high capacitances and are regarded as positions of two touch events.

Figure 8:
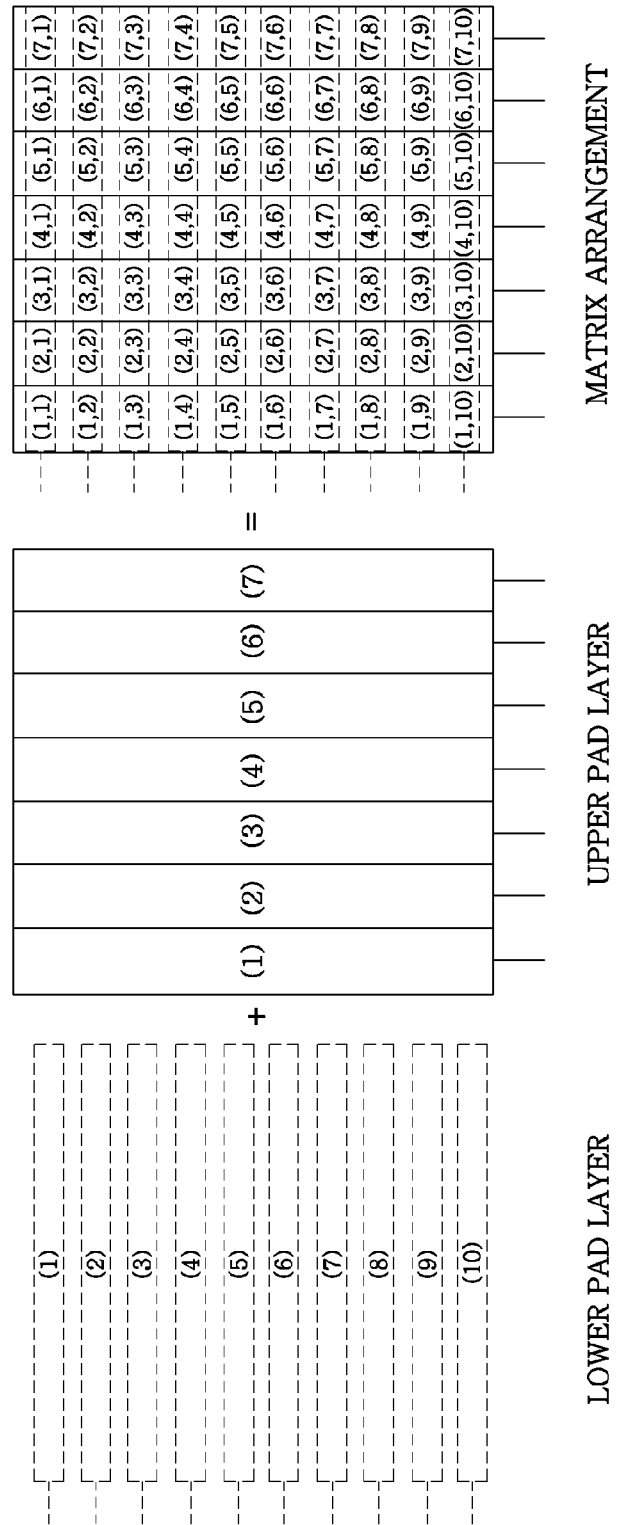
FIG. 8 illustrates a configuration of a capacitive touch pad with a matrix arrangement in accordance with a second embodiment of the present invention.

FIG. 8 illustrates a configuration of a capacitive touch pad with a matrix arrangement in accordance with a second embodiment of the present invention.

As shown in FIG. 8, a touch pad 102, e.g., having a 7×10 matrix arrangement is configured by sequentially arranging first (1) to tenth (10) lower pads of the upper pad layer 502 in a horizontal direction, sequentially arranging first (1) to seventh (7) upper pads of the upper pad layer 504 in a vertical direction, and overlying the upper pad layer 502 on the lower pad layer 504, thereby forming the matrix arrangement. The upper and lower pad layers are formed of indium-tin-oxide (ITO).

In the 7×10 matrix arrangement, cells having coordinates of positions (1,1) to (7,10) are used to sense a touch.

In the second embodiment, as shown in FIG. 8, the lower pads of the lower pad layer 504 may be arranged in such a manner that they are separate from one another in a predetermined interval.

In the touch pads shown in FIGS. 7 and 8, it has been shown and described that the upper pads and the lower pads are arranged in the vertical and horizontal direction, respectively, it will be appreciated to those skilled in the art that the upper pads may be arranged in a horizontal direction, and the lower pads may be arranged in a vertical direction.

Figure 9:
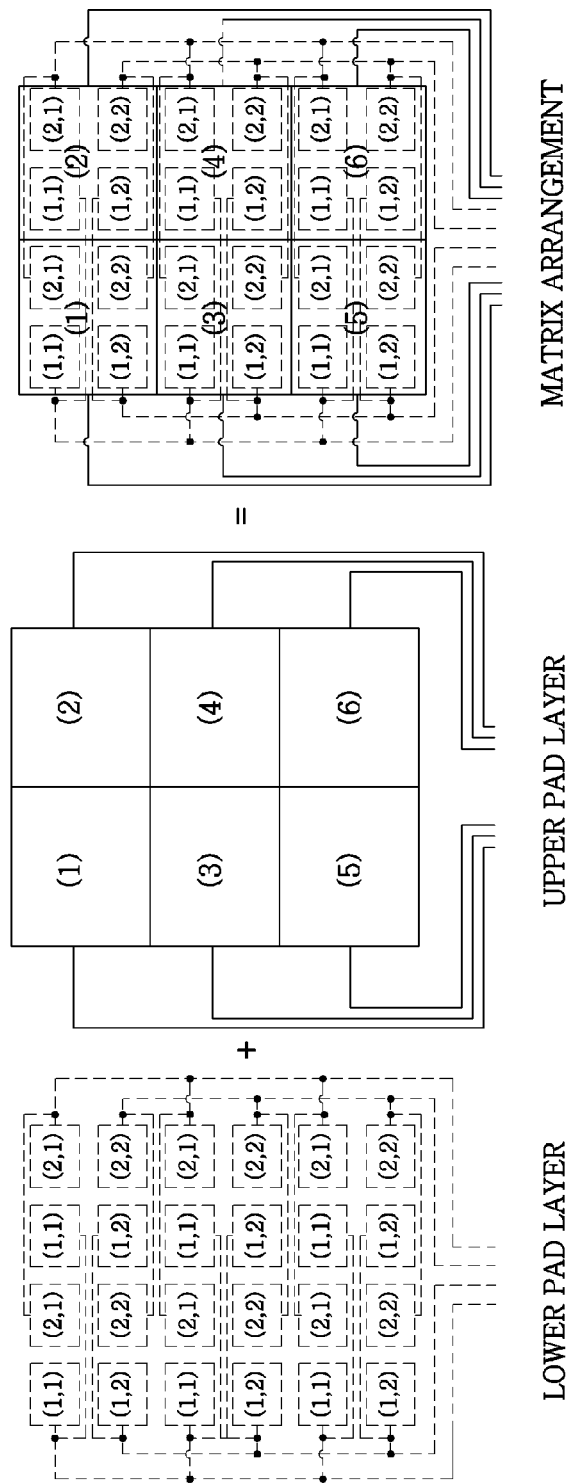
FIG. 9 illustrates a configuration of a capacitive touch pad with a matrix arrangement in accordance with a third embodiment of the present invention.

FIG. 9 illustrates a configuration of a capacitive touch pad with a matrix arrangement in accordance with a third embodiment of the present invention.

In the touch pad 102, a lower pad layer 502 includes a plurality of lower pads having an A×B matrix arrangement and an upper pad layer 504 includes a plurality of upper pads having a C×D matrix arrangement, wherein A, B, C and D are integral numbers not "0". The upper and lower pad layers are formed of indium-tin-oxide (ITO).

More specifically, the touch pad 102 is configured by arranging the lower pad layer 504, arranging the upper pad layer 504, and overlying the upper pad layer 502 on the lower pad layer 504, thereby forming the touch pad 102, as shown in FIG. 9.

As shown in FIG. 9, for example, the lower pad layer 504 may be formed in a 4×6 matrix arrangement of the lower pads, and the upper pad layer may be formed in a 2×3 matrix arrangement of lower pads.

The touch pad 120 is divided into a plurality of cell regions, each cell region including each of the upper pads and each set of four lower pads, respectively. For example, each cell region includes to each upper pad (1) to (6) corresponding to the respective cell regions (1) to (6), and a set of four sub-cells having coordinates of (1,1), (1,2), (2,1) and (2,2).

In order to detect the multi-touch in the touch pad, a control unit sequentially scans the first to sixth upper pads to put the respective upper pads into high-impedance (open circuit) state so that the capacitances can be obtained by the respective set of lower pads having coordinates (1,1), (1,2), (2,1), and (2,2).

In addition, in this embodiment, as shown in FIG. 9, the lower pads of the lower pad layer 504 may be arranged in such a manner that they are separate from one another in a predetermined interval.

The control unit 104 controls the overall operation of the touch screen device shown in FIG. 4. The control unit 104 applies a control signal to the touch pad 102. The control signal is used for sequentially scanning the upper pads of the upper pad layer 502 so that the upper pads are put in the open state in sequence. Also, the control unit 104 supplies the touch pad 102 with a sensing signal. The sensing signal is used for sequentially scanning the lower pads so that the lower pads measure the capacitances caused by a touch in the sequential open state.

Therefore, when at least one object touches, the touch pad 102 efficiently detects and recognizes one or more coordinates for one or more multi-touched positions from the matrix arrangement of the touch pad 102.

Figure 10:
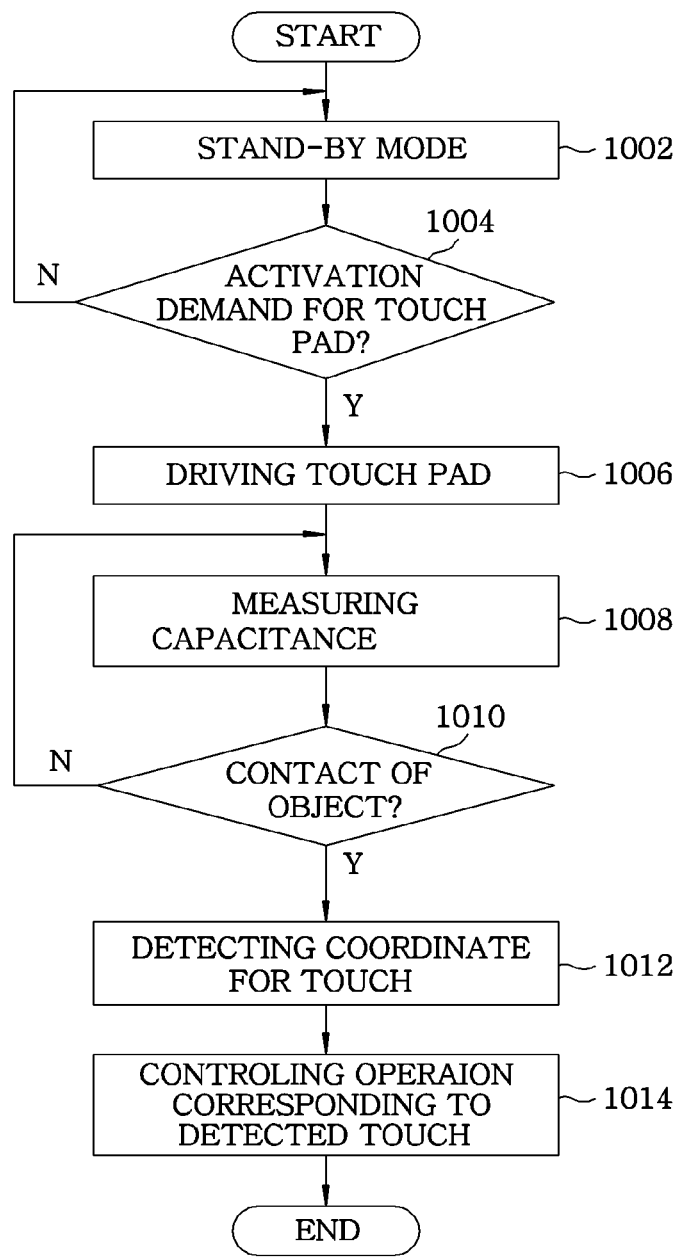
FIG. 10 is a flowchart illustrating a method for detecting multi-touch using a capacitive touch pad in accordance with an embodiment of the present invention.

FIG. 10 is a flow chart illustrating a method for detecting multi-touch using a capacitive touch pad in accordance with embodiments of the present invention.

First, in step 1002, the touch screen device stays in stand-by mode. In the stand-by mode, it is checked whether a key signal is input to demand an activation of the touch pad 102 in step 1004.

If it is checked that the key signal is input, a control signal is supplied to the touch pad 102 to drive the touch pad 102 in accordance with the key signal in step 1006.

Next, in step 1008, the control unit 104 sequentially scans the cell regions of the touch pad 102. That is, the control unit 104 supplies the touch pad 102 with a first control signal to sequentially putting the upper pads into high impedance (open) state and a second control signal to allow the lower pads to measure capacitance values.

Thereafter, during the scanning operation of the control unit 104, in step 1010, it is checked whether or not there is any touch on the basis of variations of the capacitance values.

When it is checked that there is the touch, the method goes to step 1012. However, if not, the method returns to step 1008.

In step 1012, a relatively high capacitance value is selected among capacitances, and positions of lower pads, i.e., coordinates having relatively high capacitances are detected as real positions for multi-touch.

Subsequently, in step 1014, the real coordinates detected in the touch pad 102 is transferred to the control unit 104 to control an operation corresponding to the multi-touch.

While the invention has been shown and described with respect to the embodiments, it will be understood by those skilled in the art that various changes and modifications may be made without departing from the scope of the invention as defined in the following claims.

What is claimed is:

1. A touch pad for detecting multi-touch comprising:
a lower pad layer and an upper pad layer each formed of Indium Tin Oxide (ITO), the upper pad layer being over the lower pad layer,
wherein the lower pad layer includes a plurality of lower pads arranged in a first matrix, each of the lower pads being configured to sense a capacitance value caused by the multi-touch,
wherein the upper pad layer includes a plurality of upper pads arranged in a second matrix, the second matrix including a plurality of rows and a plurality of columns,
wherein each upper pad of the plurality of upper pads corresponds to a set of lower pads, the set of lower pads including at least two lower pads,
wherein the upper pads are controlled to sequentially put each upper pad into an open state so that a set of lower pads corresponding to an upper pad that is in the open state senses capacitance values, the upper pads having control lines connected to a control unit, the upper pads being controlled by the control unit to be in the open state or a short state, the short state being a ground state,
wherein the lower pads have sensing lines connected to the control unit, a set of lower pads corresponding to an upper pad in the open state being activated to sense the multi-touch, a set of lower pads corresponding to an upper pad in the short state being deactivated, and
wherein, when a cell of an upper pad is in the open state, the cell of the upper pad and cells of lower pads corresponding to the upper pad are activated to sense the multi-touch by measuring capacitance values of the lower pads, the cells of the lower pads being substantially parallel to the cell of the upper pad.

2. The touch pad of claim 1, wherein the multi-touch is detected at one or more coordinates of lower pads sensing relatively high capacitance values.

3. The touch pad of claim 1, wherein the first matrix includes a plurality of rows and a plurality of columns.

4. The touch pad of claim 1, wherein the set of lower pads corresponding to the upper pad which is in the open state form a part of the first matrix, the first matrix including a plurality of sets of lower pads arranged in a first direction and a second direction, respectively, the first direction and the second direction being perpendicular to each other.

5. The touch pad of claim 1, wherein the upper pad which is in the open state at a time forms a part of the second matrix, the columns and rows of the second matrix being arranged in a first direction and a second direction, respectively, the first direction and the second direction being perpendicular to each other.

6. The touch pad of claim 1, wherein an upper pad entirely covers four lower pads corresponding to the upper pad.

7. A method for detecting multi-touch using a touch pad, the touch pad including a lower pad layer and an upper pad layer each formed of ITO, the upper pad layer overlying the lower pad layer, wherein the lower pad layer includes a plurality of lower pads arranged in a first matrix, the plurality of lower pads being configured to sense capacitance values caused by the multi-touch, and wherein the upper pad layer includes a plurality of upper pads arranged in a second matrix including a plurality of rows and a plurality of columns, wherein each upper pad corresponds to a set of lower pads, the set of lower pads including at least two lower pads, the method comprising:

controlling the plurality of upper pads to sequentially put each upper pad into an open state using a control unit, the plurality of upper pads having control lines connected to the control unit;

activating a set of lower pads corresponding to an upper pad in the open state to sense the multi-touch;

deactivating a set of lower pads corresponding to an upper pad in a short state, the short state being a ground state; and measuring capacitance values from the set of lower pads corresponding to the upper pad which is in the open state; and detecting one or more coordinates of lower pads sensing relatively high capacitance values, wherein, when a cell of an upper pad is in the open state, the cell of the upper pad and cells of lower pads corresponding to the upper pad are activated to sense the multi-touch by measuring capacitance values of the lower pads, the cells of the lower pads being substantially parallel to the cell of the upper pad.

8. The method of claim 7, wherein the multi-touch is determined at the one or more coordinates.

9. The method of claim 7, wherein the first matrix includes a plurality of rows and a plurality of columns.

10. The method of claim 7, wherein the set of lower pads corresponding to the upper pad which is in the open state form a part of the first matrix, the first matrix including a plurality of sets of lower pads arranged in a first direction and a second direction, respectively, the first direction and the second direction being perpendicular to each other.

11. The method of claim 7, wherein the upper pad which is in the open state at a time forms a part of the second matrix, the second matrix including the plurality of upper pads arranged in the columns and rows, respectively, the columns and rows being perpendicular to each other.

* * * * *